April 13, 1965  R. W. WENGEL  3,177,600
FILM RECORD CARD
Filed Oct. 31, 1961
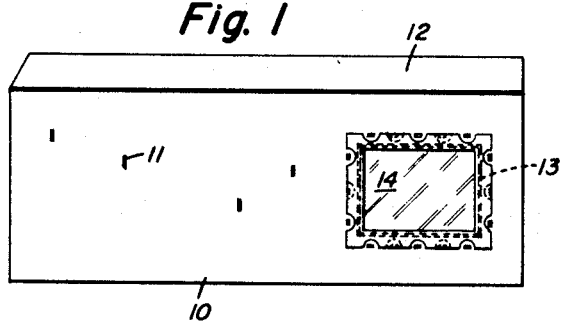
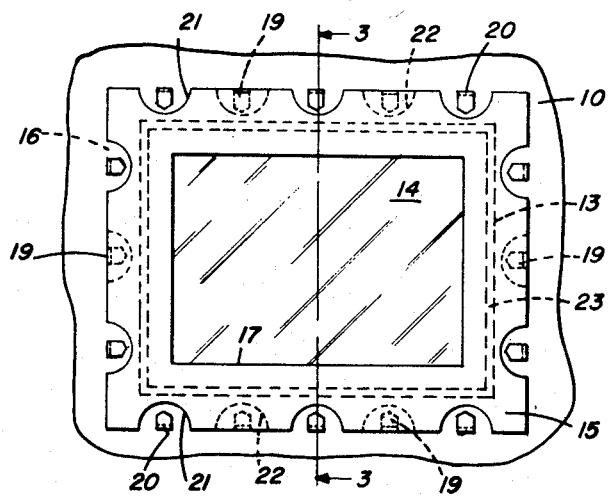
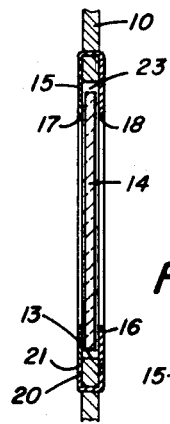
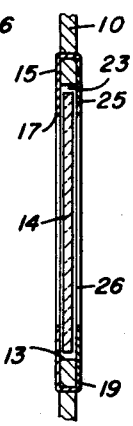
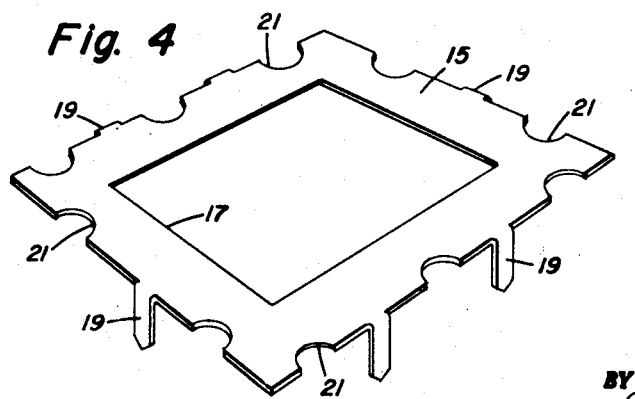
RAYMOND W. WENGEL
INVENTOR.
BY
ATTORNEY & AGENT

3,177,600
FILM RECORD CARD

Raymond W. Wengel, Rochester, N.Y., assignor to Eastman Kodak Company, Rochester, N.Y., a corporation of New Jersey
Filed Oct. 31, 1961, Ser. No. 148,991
1 Claim. (Cl. 40—158)

The present invention relates to record cards having a piece of microfilm or the like mounted in an aperture therein and to the method of mounting microfilm in such cards.

Although record cards in which a film has been mounted can be encoded with information relating to the film image, this encoded information is usually punched into the card before the film is mounted in the card. At the time the film is mounted in the card, the encoded information on the card is verified with that of the film to ensure that the proper card and film are combined. In many instances, the primary function of the record card with the film mounted therein is to provide an enlarged image of the film by projection onto a screen, to produce an enlarged copy of the film image for reference purposes, or to produce a duplicate of the film image by contact printing, the copy of duplicate being either positive or negative depending on the original image. In these instances, it is essential if best results are to be obtained, that the film be held flat in the focal plane of the optical system. This can be accomplished only if the film is mounted in the aperture in such a way that it can move normal to its own plane so it can be easily moved and pressed into contact with a flat surface in the focal plane of a projection system or with a film or photographic paper in a contact printer.

Such mounting of a film in an aperture in a record card is attained by loosely retaining the film in the card aperture by a frame of thin metal fastened to each side of the card in registry with the card aperture. The frames of thin metal are provided with pointed tabs which are spaced about the outer periphery of each frame, the tabs being pushed through the card and then clinched. In order to maintain the over-all thickness of the card to a minimum, a pair of frames is used; each frame being provided with tabs and notches arranged about the outer periphery and the tabs on one frame being aligned with the notches in the other frame. It is also possible to use only one tab frame in conjunction with a frame of thin material, such as polyester film which is well known as Mylar or a thin metal, the latter frame being adhesively secured to the card.

The primary object of the invention is, therefore, to provide means for mounting a piece of film in an aperture in a record card so as to permit movement of the piece of film normal to its own plane.

Another object of the invention is to provide means for mounting a piece of film in an aperture in a record card without the use of an adhesive or an adhesive coated frame.

Still another object of the invention is to provide at least one frame member which co-operates with a frame member already secured in registry with an aperture in the record card on one side thereof and is mechanically fastened to the other side of the card for loosely retaining a piece of film therebetween and in the card aperture.

And yet another object of the invention is to provide a pair of metal frame members for loosely retaining a piece of film in an aperture in a record card, said frame members being fastened to opposite sides of the card and in registry with the aperture therein by tab members clinched to the card.

Other object and advantages will be apparent to those skilled in the art by the description which follows.

Reference is not made to the accompanying drawing wherein like reference numerals designate like parts and wherein:

FIG. 1 is an elevation view of a record card showing a piece of film retained in an aperture in a card by metal frames in accordance with one embodiment of the invention;

FIG. 2 is an enlarged partial elevation view of the portion of the card surrounding the aperture therein and showing a pair of metal frames fastened to the card in registry with the card aperture;

FIG. 3 is a vertical section taken along line 3—3 of FIG. 2;

FIG. 4 is a detail perspective view of one of the frame members; and

FIG. 5 is a vertical section similar to FIG. 3 and showing another form of the invention.

With reference particularly to FIG. 1 of the drawing, a record card 10 is disclosed as a Hollerith or IBM card which is used in conjunction with well known card handling apparatus for utilizing the information encoded on such cards in the form of perforations, as designated by the numeral 11. Information encoded on the card can also be printed in the area 12 at the top of the card. Such a card is usually rectangular in shape and can be provided with an aperture 13 of a predetermined size and shape and in a predetermined location on the card. Aperture 13 is usually located toward one end of the card in order to provide a maximum number of columns for the encoded information and can be of a size and shape to receive a piece of 35 mm. film or a strip of 16 mm. film, the aperture 13 being shown in the drawing to be of a size and shape for receiving a frame of 35 mm. film.

Normally, the size and shape of aperture 13 is substantially the same as the piece of film 14 which is positioned therein. However, in the present invention the aperture 13 is larger than the film for the reasons set forth hereinafter. As stated above, a Hollerith or IBM card is disclosed, but a card of any similar type can be used which is equally applicable and suitable for the intended purposes. It is desirable, of course, that the thickness of the card stock be at least equal to the thickness of the film and, preferably, slightly thicker than the film 14.

With reference to FIGS. 2, 3 and 4, the frames 15 and 16 are preferably of a thin metal, such as spring tempered steel, which has been treated to prevent rusting or corrosion. Each of frames 15 and 16 is provided with an opening designated by 17 for frame 15 and 18 for frame 16. Openings 17 and 18 are similar to and smaller than aperture 13 and film 14 and the outer dimensions of the frames are larger than aperture 13. Members 19 and 20 are formed from their respective frame and at right angles thereto, said members being spaced around the periphery of their frame. As shown in FIG. 4, frame 15 is also provided with notches 21 which are spaced about the periphery thereof and on each side of the members 19. Frame 18 is also provided with notches 22, see FIG. 2. It will be noted, however, that members 19 and 20 and notches 21 and 22 are arranged opposite each other on frames 15 and 16 when said frames are secured to card 10. Notches 21 and 2 provide an area in which the members 19 and 20 can be clinched over to secure each of frames 15 and 16 to card 10 without increasing the over-all thickness as determined by the thickness of card 10 and the frames 15 and 16. As shown in FIG. 2, the ends of members 19 and 20 are clinched toward aperture 13 so as to lie within notches 21 and 22. The same over-all thickness can be maintained if members 19 and 20 were clinched in the opposite direction, thereby eliminating notches 21 and 22. However, if this is done, the effective coding area of the card is reduced. The ends of members 19 and 20 are tapered to permit the ends to readily pierce card 10 when the card, frames and film are being assembled.

In order to eliminate the necessity for providing two different frames 15 and 16 for each card because of the location of members 19 and 20 and notches 21 and 22 as just described, a single frame can be utilized if a notch 20 in one side of the frame is positioned opposite a member 19 on the opposite side. With such a frame the notches 20 and members 19 on any two frames will always be aligned when properly positioned with respect to the card.

The card 10 is first provided with aperture 13 by die cutting the aperture in accordance with the requisite size and shape and in the predetermined location on the card. The size of aperture 13 is such as to permit a substantial gap 23 between the edge of the aperture and the edges of film 14. One of frames 15 or 16 is located with respect to card 10 so aperture 13 and opening 18, for example, are in registry. Frame 16 is then moved so the ends of members 20 pierce card 10 and the frame is contiguous with the card 10. The members 20 are then clinched to the opposite side of card 10 to secure frame 16 in position. Film 14 is then positioned in aperture 13 and against the portion of frame 16 which overlies aperture 13. In a similar manner, frame 15 is positioned over card 10 so its opening 17 is in registry with aperture 13 and the opening 18 in frame 16. Frame 15 is then urged toward card 10 so its members 19 pierce the card, said members being clinched to the opposite side of card 10 to secure frame 15 in contiguous relation with the card. Because of the spacing of members 19 and 20 and the notches 21 and 22 on the respective frames 15 and 16, the members on one frame will be clinched over into the area of the notches in the other frame, as shown in FIG. 2. With this arrangement, the area of card 10 which is covered by frames 15 and 16 is no larger than the frames; however, as mentioned above, if notches 21 and 22 are not used, the members 19 and 20 can be clinched in either direction to overlap a frame or to extend beyond the area of the frames. If the members 19 and 20 overlap the frames, the thickness of the card structure is increased, and if clinched over the card, the effective area of the card is reduced. It can be readily appreciated, therefore, that notches 21 and 22 serve a useful purpose. Since the frames 15 and 16 overlie the aperture 13 on both sides of card 10, film 14 is loosely retained between the frames and within aperture 13.

In order to properly register frames 15 and 16 with aperture 13 and at the same time eliminate the necessity for piercing card 10 with members 19 and 20, card 10 can be pierced with a suitable die at the same time aperture 13 is cut in card 10. As shown in FIG. 2, such piercings of card 10 would be spaced from and about aperture 13 in accordance with the number of members 19 and 20 on both of frames 15 and 16. Accordingly, five piercings would be made on each side of the long dimension of aperture 13 and three piercings on each side of the short dimension of aperture 13. The piercings would be of a size and shape so as to readily receive members 19 and 20.

In another embodiment of the invention shown in FIG. 5, the card 10 can be provided with a frame 25 having an opening 26, frame 25 being secured to card 10 by a pressure-sensitive or heat-sensitive adhesive applied to one surface of the card at the marginal portions of aperture 13. Frame 25 can be of paper, metal, or transparent film such as Mylar, and secured to the card immediately after aperture 13 is formed therein. As in the embodiment described above, card 10 can also be pierced to receive the members 19 or 20 and sold in this form for mounting the film 14. Frames 15 or 16 are supplied with the card to retain the film in aperture 13 between frame 25 and one of frames 15 or 16 in accordance with the piercings in the card. If the card is pierced in accordance with the above embodiment, then either frame 15 or 16 can be used as the single frame.

The film 14 is positioned in aperture 13 and against the portion of frame 25 which overlies aperture 13. One of frames 15 or 16 (for example, frame 15) is then placed over the card with the members 19 engaging the piercings in the card. When frame 15 is moved against the card, the members 19 project through and extend from the side on which frame 25 is secured. Members 19 are then clinched to secure frame 15 to card 10. Frame 25 can also be provided with notches spaced about its outer periphery in accordance with the location of members 19 and/or 20 to maintain the thickness of the card structure to a minimum dimension.

In both of the embodiments of the invention described above, film 14 is smaller than aperture 13 so as to provide the gap 23. Also, the film 14, when mounted in the aperture of an IBM card, is thinner than the card stock. This freedom of movement of film 14 is of primary importance in that film 14 can be moved normal to its own plane when a card is positioned in a projection system, a projection printer or a contact printer so as to obtain intimate contact of the film with the locating surface in such apparatus.

While other modifications in the invention will be suggested to those skilled in the art, the scope of the invention is not to be limited by the described embodiments but is of a scope as defined by the appended claim.

Having now particularly described my invention, what I desire to secure by Letters Patent of the United States and what I claim is:

A record card provided with an aperture of a predetermined size and shape in a predetermined location on said card in which a piece of film of substantially the same size and shape as said aperture is retained so as to permit movement thereof in a direction normal to its own plane;
  a first thin, metallic frame having a central opening substantially similar to and smaller than said aperture, a plurality of notches spaced along the outer peripheral edges of said first frame, and a card piercing member arranged between each pair of adjacent notches and formed substantially at right angles to said first frame for clinching the latter to the other side of said card in registry with said first frame;
  a second thin, metallic frame having a central opening corresponding to said opening in said first frame, a plurality of notches spaced along the outer peripheral edges of said second frame, and a card piercing member arranged between each pair of adjacent notches and formed substantially at right angles to said second frame for clinching the latter to the other side of said card in registry with said first frame;
  the card piercing members on one frame being opposite the notches in the other frame so that when said card piercing members are clinched in a direction toward said openings, those on one frame lie within the notches of the other frame; and
  the portions of said first and second frames overlying said aperture cooperating with the peripheral edges of said aperture to form a channel in which said piece of film is loosely retained.

References Cited by the Examiner
UNITED STATES PATENTS

| 2,256,399 | 9/41 | MacHarg | 40—158 X |
| 2,292,312 | 8/42 | Wittel | 40—158 |
| 2,496,141 | 1/50 | Abrams | 40—159 |
| 2,505,250 | 4/50 | Kime | 40—152 |
| 2,524,306 | 10/50 | Buzzerd | 40—159 |
| 2,571,764 | 10/51 | Rodger et al. | 40—158 |
| 2,843,955 | 7/58 | Engelstein | 40—158 |

JEROME SCHNALL, *Primary Examiner.*

E. V. BENHAM, *Examiner.*